United States Patent
Xu et al.

(10) Patent No.: US 12,097,487 B2
(45) Date of Patent: Sep. 24, 2024

(54) CATALYST FOR INDUCING THERMAL DESORPTION OF ORGANIC MATTER-CONTAMINATED SOIL AND PREPARATION METHOD THEREOF

(71) Applicants: NANJING TECH UNIVERSITY, Jiangsu (CN); NANJING GEKOF INSTITUTE OF ENVIRONMENTAL PROTECTION TECHNOLOGY & EQUIPMENT CO., LTD., Jiangsu (CN)

(72) Inventors: Haitao Xu, Nanjing (CN); Qijie Jin, Nanjing (CN); Mutao Xu, Nanjing (CN); Wenyu Ji, Nanjing (CN); Yao Lu, Nanjing (CN); Mingbo Li, Nanjing (CN); Meng Xu, Nanjing (CN); Jing Song, Nanjing (CN)

(73) Assignees: NANJING TECH UNIVERSITY, Nanjing (CN); NANJING GEKOF INSTITUTE OF ENVIRONMENTAL PROTECTION TECHNOLOGY & EQUIPMENT CO., LTD., Nanjing (CN)

(*) Notice: Subject to any disclaimer, the term of this patent is extended or adjusted under 35 U.S.C. 154(b) by 171 days.

(21) Appl. No.: 17/879,060

(22) Filed: Aug. 2, 2022

(65) Prior Publication Data
US 2023/0044974 A1 Feb. 9, 2023

(30) Foreign Application Priority Data
Aug. 3, 2021 (CN) .......................... 202110889704

(51) Int. Cl.
*B01J 31/30* (2006.01)
*B01J 23/745* (2006.01)
(Continued)

(52) U.S. Cl.
CPC ............ *B01J 31/30* (2013.01); *B01J 23/745* (2013.01); *B01J 27/128* (2013.01);
(Continued)

(58) Field of Classification Search
CPC ........ B01J 31/30; B01J 31/0231; B01J 35/23; B01J 23/745; B01J 27/128; B01J 37/04; B09C 1/06; B09C 1/08; C01G 49/02–08
See application file for complete search history.

(56) References Cited

U.S. PATENT DOCUMENTS 11,473,013 B1* 10/2022 Chen ..................... C09K 17/46

FOREIGN PATENT DOCUMENTS

CN 101176879 A 5/2008
CN 106111686 A 11/2016
(Continued)

OTHER PUBLICATIONS

Agarwal, Ashutosh, Himanshu Joshi, and Anil Kumar. "Synthesis, characterization and application of nano lepidocrocite and magnetite in the degradation of carbon tetrachloride." South African Journal of Chemistry 64 (2011): 218-224.*
(Continued)

*Primary Examiner* — Richard M Rump
(74) *Attorney, Agent, or Firm* — Oliff PLC

(57) ABSTRACT

A catalyst for inducing thermal desorption of organic matter-contaminated soil and a preparation method thereof, which uses a colloidal mixture of ferroferric oxide and ferric chloride as a catalytic active component of thermal desorption, and carbon tetrachloride as a solvent. Based on the mass of solvent, a mass percentage of catalytic active component is 0.1%-15%. Ammonia water is added dropwise to ferric chloride aqueous solution to react in oil bath to generate a ferroferric oxide colloidal solution, then ferric chloride and obtained ferroferric oxide colloidal solution are
(Continued)

added to carbon tetrachloride, and mixed solution is continuously stirred in an oil bath to evaporate solvent water to prepare a catalyst with carbon tetrachloride as solvent. Catalyst is environmentally friendly and can induce thermal desorption of organic matters in soil. 100% desorption of chlorobenzene, o-xylene and benzo[A]anthracene can be achieved at 130° C., and energy consumption of thermal desorption is greatly reduced.

10 Claims, 2 Drawing Sheets

(51) Int. Cl.
*B01J 27/128* (2006.01)
*B01J 31/02* (2006.01)
*B01J 35/23* (2024.01)
*B01J 37/04* (2006.01)
*B09C 1/06* (2006.01)
*B09C 1/08* (2006.01)

(52) U.S. Cl.
CPC ........... *B01J 31/0231* (2013.01); *B01J 35/23* (2024.01); *B01J 37/04* (2013.01); *B09C 1/06* (2013.01); *B09C 1/08* (2013.01)

(56) References Cited

FOREIGN PATENT DOCUMENTS

| | | |
|---|---|---|
| CN | 108793381 A | 11/2018 |
| CN | 110404539 A | 11/2019 |
| CN | 111530908 A | 8/2020 |
| CN | 113061441 A | 7/2021 |

OTHER PUBLICATIONS

Mahdavi Matin, Maryam, Mohsen Hakimi, and M. Mazloum-Ardakani. "The effect of preparation method and presence of impurity on structural properties and morphology of iron oxide." Journal of Optoelectronical Nanostructures 2.1 (2017): 1-8.*
Dai, Zhiyou, "Study on Degradation of Polychlorinated Biphenyls in Soil by Metal Oxides" 2017.

* cited by examiner

CATALYST FOR INDUCING THERMAL DESORPTION OF ORGANIC MATTER-CONTAMINATED SOIL AND PREPARATION METHOD THEREOF

TECHNICAL FIELD

The present disclosure relates to a novel catalyst for inducing thermal desorption of organic matter-contaminated soil and a preparation method thereof, and belongs to the fields of environment-friendly catalytic materials and soil remediation.

BACKGROUND

With rapid development of economy and urban construction as well as promulgation of relevant national policies, many cities have adjusted their industrial structure and urban planning, and closed and relocated many chemical enterprises, thus leaving behind a large number of organically contaminated sites. The organic matters not only directly cause great harm to soil, animals, plants, microorganisms and ecosystems, but also can enter the human body through steam inhalation, skin contact, etc., causing great harm to the human body. The remediation and governance of organic matter-contaminated soil have become a major issue that is unavoidable in the country and concerns people's livelihood, and the governance and remediation demands of the organic matter-contaminated soil are of great social value and economic value.

Research on various remediation technologies and equipment for organically contaminated sites has been earned out extensively in recent years, and relevant research findings have also been applied to the remediation of contaminated sites. Thermal desorption remediation technology is widely used in treatment of soil, sludge, sediment and other sites containing volatile and semi-volatile organic pollutants due to its advantages of high treatment efficiency, short remediation period, wide application range, etc. The pollutants that can be treated by thermal desorption include nitrobenzene, polybrominated diphenyl ethers, chlorobenzene, mercury, polychlorinated biphenyls, polycyclic aromatic hydrocarbons, etc. However, distribution of the pollutants in a contaminated soil area is uneven, and the pollutants often have a high boiling point, which requires a large amount of heat energy during a treatment process. According to preliminary statistics of actual projects, the fuel cost accounts for 60% of the operating cost. The moisture content of contaminated soil has a particularly significant impact on energy consumption. According to the research, under constant conditions of a soil organic matter content of 10 g/kg, a specific heat capacity of 0.58 kJ/(kg·° C.), a heating temperature of 343° C., and an exhaust gas temperature of thermal desorption of 178° C., when the soil moisture content is 10-15%, the energy consumed for heating the soil is basically the same as that consumed for evaporating water, while when the moisture content is higher than 15%, the energy consumed for evaporating water exceeds that consumed for heating the soil. In addition, patent CN103658165A also pointed out that high temperature exhaust gas in a remediation process is mainly the cause of thermal energy loss in a thermal desorption system. In the traditional rotary kiln heating system, when the soil treatment capacity is 25 $m^3$/h, the heat loss from high temperature flue gas is 30-60%. While the high temperature flue gas brings about heat loss, it also causes difficulty in exhaust gas treatment and increases the cost for treating exhaust gas. Therefore, it is of great engineering significance to optimize a thermal desorption system for reducing heat loss and reducing the cost of contaminated soil disposal.

SUMMARY

One objective of the present disclosure is to provide a novel catalyst for inducing thermal desorption of organic matter-contaminated soil aiming at the current situation and problems of the existing soil thermal desorption technology; another objective of the present disclosure is to provide a preparation method of the aforementioned catalyst; and a third Objective of the present disclosure is to provide a method for carrying out thermal desorption of organic pollutants using the aforementioned catalyst.

A novel catalyst for inducing thermal desorption of organic matter-contaminated soil is provided. The catalyst uses a colloidal mixture of ferroferric oxide and ferric chloride as a catalytic active component of thermal desorption, and carbon tetrachloride as a solvent; and based on the mass of the solvent, a mass percentage of the catalytic active component is 0.1%-5%.

In the technical solutions of the present disclosure, a mass ratio of the ferroferric oxide to the ferric chloride in the active component is 1:(0.1-10).

In some preferred technical solutions, the mass percentage of the catalytic active component is 0.1%-3%, and the mass ratio of the ferroferric oxide to the ferric chloride in the active component is 1:(0.1-3).

A preparation method of the aforementioned catalyst is provided. The preparation method of the catalyst includes:

(1) Preparation of an Active Component Colloidal Solution

Stirring a ferric chloride solution at a temperature of 80-100° C., introducing nitrogen to remove oxygen from the solution, then slowly adding ammonia water, and reacting for 2-6 h to obtain a ferroferric oxide colloidal solution.

(2) Preparation of the Catalyst

Adding ferric chloride and the ferroferric oxide colloidal solution prepared in step (1) into carbon tetrachloride, and evaporating a solvent from the ferroferric oxide colloidal solution to prepare the catalyst with the carbon tetrachloride as the solvent.

In the above method, a temperature for evaporating the solvent in step (2) is 110-1.50° C.

In the above method, a mass ratio of the ferric chloride to the ammonia water in step (1) is 1:0.5-3.

In some specific technical solutions, the mass ratio of the ferric chloride to the ammonia water in step (1) is 1:0.5-2.

A method for carrying out thermal desorption of organic matter-contaminated soil using the aforementioned catalyst is provided. The method uses air as a carrier gas, and includes: contacting an evaporated gas of the catalyst with contaminated soil; carrying out thermal desorption at a temperature of 100-150° C. for 20-30 min to decompose organic pollutants under the action of the ferroferric oxide and the ferric chloride in the process of thermal desorption; and separating the decomposed gas and carbon tetrachloride gas from the soil, thus completing the thermal desorption process of the organic matter-contaminated soil.

In the technical solutions of the present disclosure, a mass ratio of the catalyst to the contaminated soil is (1-10):5.

The experimental conditions and results of thermal desorption of the present disclosure are as follows: weighing and putting 5 g of soil containing 1% organic pollutants into a catalyst performance evaluation reaction device, an inner diameter of a quartz tube in the evaluation reaction device being 10 mm, and introducing the catalyst for performance evaluation. The organic pollutants are chlorobenzene (when used), o-xylene (when used) and benzo[A]anthracene (when used), the thermal desorption temperature is 100-150° C., the catalyst introducing rate is 80 μL/min, and air is used as the carrier gas. The catalyst is injected into a scrubbing bottle at 100-150° C. by a micro-flow injection pump to form a gas. The carrier gas is introduced into the scrubbing bottle and uniformly mixed with the catalyst gas, and then the mixed gas is introduced into the evaluation reaction device. A carrier gas flow is 400 Ml/min. The desorption effects of the chlorobenzene, the o-xylene and the benzo[A] anthracene all reach 100% after 30 min of thermal desorption at 130° C., and the carbon tetrachloride and the ferroferric oxide in the catalyst components can be fully recovered after the reaction.

Beneficial effects:

The catalyst prepared in the present disclosure has the following advantages:

(1) The carbon tetrachloride solvent forms vapor at 130° C. and is mixed with hot air. When passing through the soil, the mixed gas can dissolve the liquid or solid organic pollutants in the soil based on the theory of like dissolves like, and the boiling point of the organic mixture is reduced so that organic vapors can be formed at 130° C.;

(2) After being dissolved in the carbon tetrachloride solvent, the ferroferric oxide colloid is adsorbed in the soil under the action of the 130° C. hot air, catalyzes oxidation of the organic pollutants at 130° C. and decomposes the organic pollutants into organic matters with a lower boiling point, thereby further reducing the boiling point of the organic pollutants in the soil;

(3) The ferric chloride and the ferroferric oxide in the catalyst have a synergistic catalytic effect to improve the catalytic effect of the ferroferric oxide;

(4) After thermal desorption, the carbon tetrachloride solvent can be recycled in liquid by natural cooling, and the ferroferric oxide is magnetic and can be recycled by magnet adsorption; and (5) Although a trace amount of ferric chloride is adsorbed in the soil and cannot be recycled, the soil that adsorbs the trace amount of ferric chloride is beneficial to improve photosynthesis of plants in later applications, thereby increasing the yield of plants or crops.

Accordingly, not only the catalyst prepared in the present disclosure can greatly reduce the energy consumption of soil thermal desorption and reduce the cost of industrial thermal desorption, but also the carbon tetrachloride and the ferroferric oxide in the catalyst can be fully recycled and the soil that adsorbs the trace amount of ferric chloride can improve the photosynthesis of plants. In addition, the catalyst is environmentally friendly in components, simple in preparation process, low in cost, and high in cost-effectiveness, and has strong application and promotion value.

DETAILED DESCRIPTION

The present invention is further described below with reference to embodiments, but the protection scope of the present invention is not limited thereto.

Embodiment 1

(1) Preparation of an Active Component Colloidal Solution 1.0508 g of ferric chloride was weighed and added to 10.508 g of deionized water and stirred in an oil bath at a temperature of 100° C. Nitrogen was introduced for 1 h to remove oxygen from the solution. Then 0.5254 g of ammonia water was added dropwise to the ferric chloride solution to react for 2 h to obtain a colloidal solution containing 0.5 g of ferroferric oxide.

(2) Preparation of a Catalyst

Based on the mass of a carbon tetrachloride solvent, according to the situation that a mass percentage of an active component accounted for 0.1% of the mass of the solvent, 0.05 g of ferric chloride was weighed and added together with the ferroferric oxide colloidal solution prepared in step (1) to 550 g of carbon tetrachloride. The mixed solution was continuously stirred in an oil bath at 110° C. to evaporate a solvent from the ferroferric oxide colloidal solution to prepare the catalyst with the carbon tetrachloride as the solvent.

(3) Catalytic Activity Test

Figure 1:
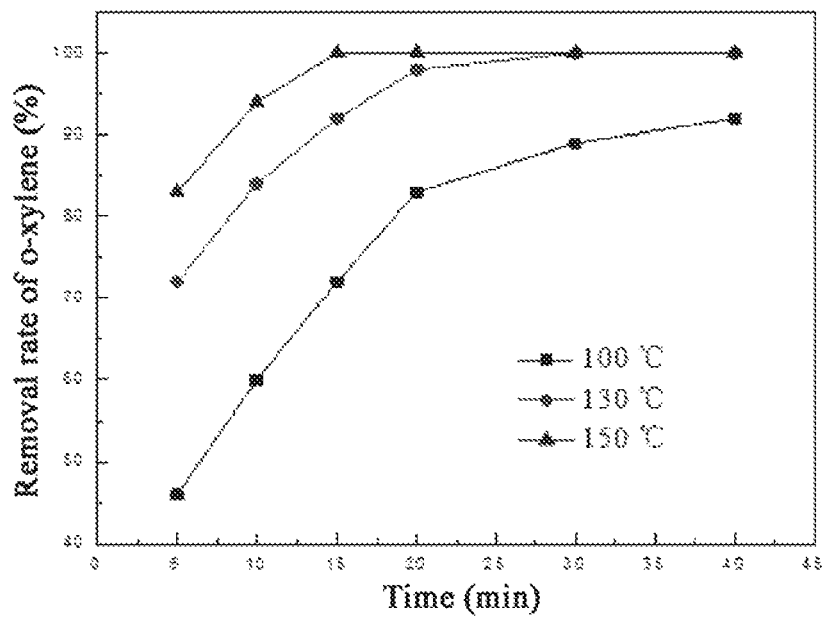
FIG. 1 shows performance of a catalyst prepared in Embodiment 1.

As shown in FIG. 1, 5 g of soil containing 1% o-xylene was weighed and put into a catalyst performance evaluation reaction device; an inner diameter of a quartz tube in the evaluation reaction device was 10 mm; and the catalyst was introduced for performance evaluation. A thermal desorption temperature was 100-150° C.; a catalyst introducing rate was 80 μL/min; and air was used as a carrier gas. The catalyst was injected into a scrubbing bottle at 100-150° C. by a micro-flow injection pump to form a gas. The carrier gas was introduced into the scrubbing bottle and uniformly mixed with the catalyst gas, and then the mixed gas was introduced into the evaluation reaction device. A carrier gas flow was 400 mL/min. The desorption effect of the o-xylene reached 100% after 30 min of thermal desorption at 130° C., and the carbon tetrachloride and the ferroferric oxide in the catalyst components could be fully recovered after the reaction.

Embodiment 2

(1) Preparation of an Active Component Colloidal Solution 1.0508 g of ferric chloride was weighed and added to 10.508 g of deionized water and stirred in an oil bath at a temperature of 80° C. Nitrogen was introduced for 1 h to remove oxygen from the solution. Then 2.1016 g of ammonia water was added dropwise to the ferric chloride solution to react for 6 h to obtain a colloidal solution containing 0.5 g of ferroferric oxide.

(2) Preparation of a Catalyst

Based on the mass of a carbon tetrachloride solvent, according to the situation that a mass percentage of an active component accounted for 3% of the mass of the solvent, 1.5 g of ferric chloride was weighed and added together with the ferroferric oxide colloidal solution prepared in step (1) to 66.667 g of carbon tetrachloride. The mixed solution was continuously stirred in an oil bath at 150° C. to evaporate a solvent from the ferroferric oxide colloidal solution to prepare the catalyst with the carbon tetrachloride as the solvent.

(3) Catalytic Activity Test

Figure 2:
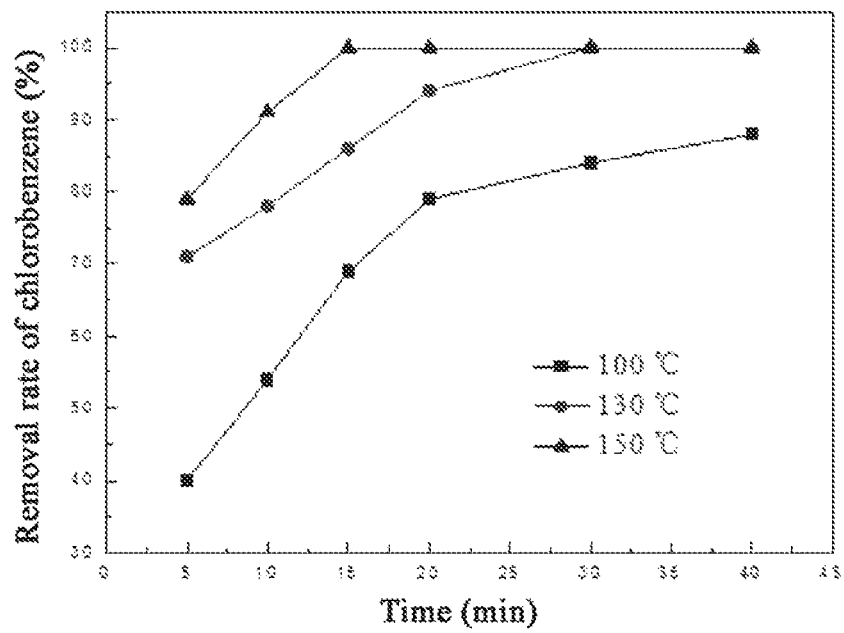
FIG. 2 shows performance of a catalyst prepared in Embodiment 2.

As shown in FIG. 2, 5 g of soil containing 1% chlorobenzene was weighed and put into a catalyst performance evaluation reaction device; an inner diameter of a quartz tube in the evaluation reaction device was 10 mm; and the catalyst was introduced for performance evaluation. A thermal desorption temperature was 100-150° C.; a catalyst introducing rate was 80 μ/min; and air was used as a carrier gas. The catalyst was injected into a scrubbing bottle at 100-150° C. by a micro-flow-injection pump to form a gas. The carrier gas was introduced into the scrubbing bottle and uniformly mixed with the catalyst gas, and then the mixed gas was introduced into the evaluation reaction device. A carrier gas flow was 400 ML/min. The desorption effect of the chlorobenzene reached 100% after 30 min of thermal desorption at 130° C., and the carbon tetrachloride and the ferroferric oxide in the catalyst components could be fully recovered after the reaction.

Embodiment 3

(1) Preparation of an Active Component Colloidal Solution 1.0508 g of ferric chloride was weighed and added to 10.508 g of deionized water and stirred in an oil bath at a temperature of 80° C. Nitrogen was introduced for 1 h to remove oxygen from the solution. Then 0.5254 g of ammonia water was added dropwise to the ferric chloride solution to react for 4 h to obtain a colloidal solution containing 0.5 g of ferroferric oxide.

(2) Preparation of a Catalyst

Based on the mass of a carbon tetrachloride solvent, according to the situation that a mass percentage of an active component accounted for 0.5% of the mass of the solvent, 0.5 g of ferric chloride was weighed and added together with the ferroferric oxide colloidal solution prepared in step (1) to 500 g of carbon tetrachloride. The mixed solution was continuously stirred in an oil bath at 130° C. to evaporate a solvent from the ferroferric oxide colloidal solution to prepare the catalyst with the carbon tetrachloride as the solvent.

(3) Catalytic Activity Test

Figure 3:
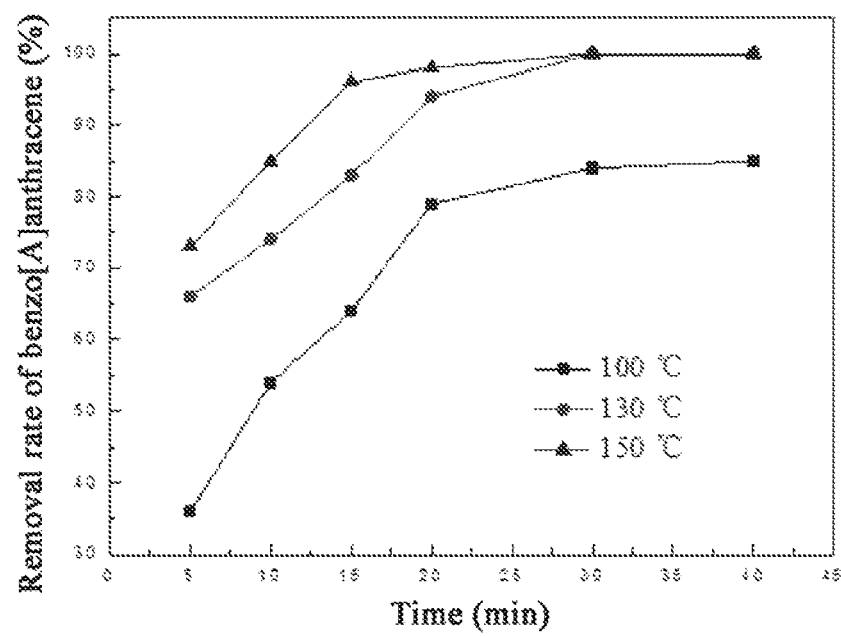
FIG. 3 shows performance of a catalyst prepared in Embodiment 3.

As shown in FIG. 3, 5 g of soil containing 1% benzo[A] anthracene was weighed and put into a catalyst performance evaluation reaction device; an inner diameter of a quartz tube in the evaluation reaction device was 10 mm; and the catalyst was introduced for performance evaluation. A thermal desorption temperature was 100-150° C.; a catalyst introducing rate was 80 μL/min; and air was used as a carrier gas. The catalyst was injected into a scrubbing bottle at 100-150° C. by a micro-flow injection pump to form a gas. The carrier gas was introduced into the scrubbing bottle and uniformly mixed with the catalyst gas, and then the mixed gas was introduced into the evaluation reaction device. A carrier gas flow was 400 mL/min. The desorption effect of the benzo[A]anthracene reached 100% after 30 min of thermal desorption at 130° C., and the carbon tetrachloride and the ferroferric oxide in the catalyst components could be fully recovered after the reaction.

Comparative Embodiment 1

(1) Preparation of a Catalyst

The conditions were the same as those in Embodiment 1, except that no ferroferric oxide colloid was added in preparation of the catalyst.

(2) Catalytic Activity Test 5 g of soil containing 1% o-xylene was weighed and put into a catalyst performance evaluation reaction device; an inner diameter of a quartz tube in the evaluation reaction device was 10 mm; and the catalyst was introduced for performance evaluation. Thermal desorption temperatures were 130° C. and 140° C.; a catalyst introducing rate was 80 μL/min; and air was used as a carrier gas. The catalyst was injected into a scrubbing bottle at 130° C. by a micro-flow injection pump to form a gas. The carrier gas was introduced into the scrubbing bottle and uniformly mixed with the catalyst gas, and then the mixed gas was introduced into the evaluation reaction device. A carrier gas flow was 400 mL/min. The desorption effect of the o-xylene was only 87% after 30 min of thermal desorption at 130° C., and the desorption effect of the o-xylene reached 95% after 30 min of thermal desorption at 140° C.

(3) Comparison of Effect

Compared with Embodiment 1, it could be seen that when no ferroferric oxide colloid was added in preparation of the catalyst, the required thermal desorption temperature increased, and the desorption effect decreased.

Comparative Embodiment 2

(1) Preparation of a Catalyst

The conditions were the same as those in Embodiment 2, except that no ferric chloride was added in preparation of the catalyst.

(2) Catalytic Activity Test 5 g of soil containing 1% chlorobenzene was weighed and put into a catalyst performance evaluation reaction device; an inner diameter of a quartz tube in the evaluation reaction device was 10 mm; and the catalyst was introduced for performance evaluation. A thermal desorption temperature was 130° C.; a catalyst introducing rate was 80 μL/min; and air was used as a carrier gas. The catalyst was injected into a scrubbing bottle at 130° C. by a micro-flow injection pump to form a gas. The carrier gas was introduced into the scrubbing bottle and uniformly mixed with the catalyst gas, and then the mixed gas was introduced into the evaluation reaction device. A carrier gas flow was 400 mL/min. The desorption effect of the chlorobenzene was only 94% after 30 min of thermal desorption at 130° C.

(3) Comparison of Effect

Compared with Embodiment 2, it could be seen that when no ferric chloride was added in preparation of the catalyst, the desorption effect decreased.

Comparative Embodiment 3

(1) Catalytic Activity Test 5 g of soil containing 1% benzo[A]anthracene was weighed and put into a catalyst performance evaluation reaction device; an inner diameter of a quartz tube in the evaluation reaction device was 10 mm; and hot air of 130° C. 200° C. and 438° C. was introduced instead of a catalyst for performance evaluation. Thermal desorption temperatures were 130° C., 200° C. and 438° C. respectively. An air flow was 400 mL/min. The desorption effect of the benzo [A]anthracene was 3% after 30 min of thermal desorption at 130° C.; the desorption effect of the benzo[A]anthracene was 21% after 30 min of thermal desorption at 200° C.; and the desorption effect of the benzo[A]anthracene was 100% after 30 min of thermal desorption at 438° C.

(3) Comparison of Effect

Compared with Embodiment 3, it could be seen that under the condition that only the hot air of different temperatures was added instead of a catalyst to carry out thermal desorption, only when the temperature was higher than the boiling point of benzo[A]anthracene (437.6° C.), the desorption effect could reach 100%, and when the temperature of the hot air was lower than the boiling point of benzo[A]anthracene and higher than the melting point (160.5° C.), the desorption effect was also very low.

What is claimed is:

1. A novel catalyst for inducing thermal desorption of organic matter-contaminated soil, wherein the catalyst uses a colloidal mixture of ferroferric oxide and ferric chloride as a catalytic active component of thermal desorption, and carbon tetrachloride as a solvent; and based on the mass of the solvent, a mass percentage of the catalytic active component is 0.1%-15%.

2. The novel catalyst for inducing thermal desorption of organic matter-contaminated soil according to claim 1, wherein a mass ratio of the ferroferric oxide to the ferric chloride in the active component is 1:(0.1-10).

3. The novel catalyst for inducing thermal desorption of organic matter-contaminated soil according to claim 1, wherein the mass percentage of the catalytic active component is 0.1%-3%, and the mass ratio of the ferroferric oxide to the ferric chloride in the active component is 1:(0.1-3).

4. A preparation method of the catalyst according to claim 1, wherein the preparation method of the catalyst comprises:

Step (1) Preparation of an active component colloidal solution:

stirring a ferric chloride solution at a temperature of 80-100° C., introducing nitrogen to remove oxygen from the solution, then slowly adding ammonia water, and reacting for 2-6 h to obtain a ferroferric oxide colloidal solution; and Step (2) Preparation of the catalyst:

adding ferric chloride and the ferroferric oxide colloidal solution prepared in step (1) into carbon tetrachloride, and evaporating a solvent from the ferroferric oxide colloidal solution to prepare the catalyst with the carbon tetrachloride as the solvent.

5. The preparation method according to claim 4, wherein a temperature for evaporating the solvent in step (2) is 110-150° C.

6. The preparation method according to claim 4, wherein a mass ratio of the ferric chloride to the ammonia water in step (1) is 1:0.5-3.

7. The preparation method according to claim 6, wherein the mass ratio of the ferric chloride to the ammonia water in step (1) is 1:0.5-2.

8. A method for carrying out thermal desorption of organic matter-contaminated soil using the catalyst according to claim 1, wherein the method uses air as a carrier gas, and comprises: contacting an evaporated gas of the catalyst with contaminated soil; carrying out thermal desorption at a temperature of 100-150° C. for 20-30 min to decompose organic pollutants under the action of the ferroferric oxide and the ferric chloride in the process of thermal desorption; and separating the decomposed gas and carbon tetrachloride gas from the soil, thus completing the thermal desorption process of the organic matter-contaminated soil.

9. The method according to claim 8, wherein a mass ratio of the catalyst to the contaminated soil is (1-10):5.

10. The novel catalyst for inducing thermal desorption of organic matter-contaminated soil according to claim 2, wherein the mass percentage of the catalytic active component is 0.1%-3%, and the mass ratio of the ferroferric oxide to the ferric chloride in the active component is 1:(0.1-3).

* * * * *